J. COLLMAN & J COLLMAN, Jr
Nut-Locks.
No. 197,606. Patented Nov. 27, 1877.
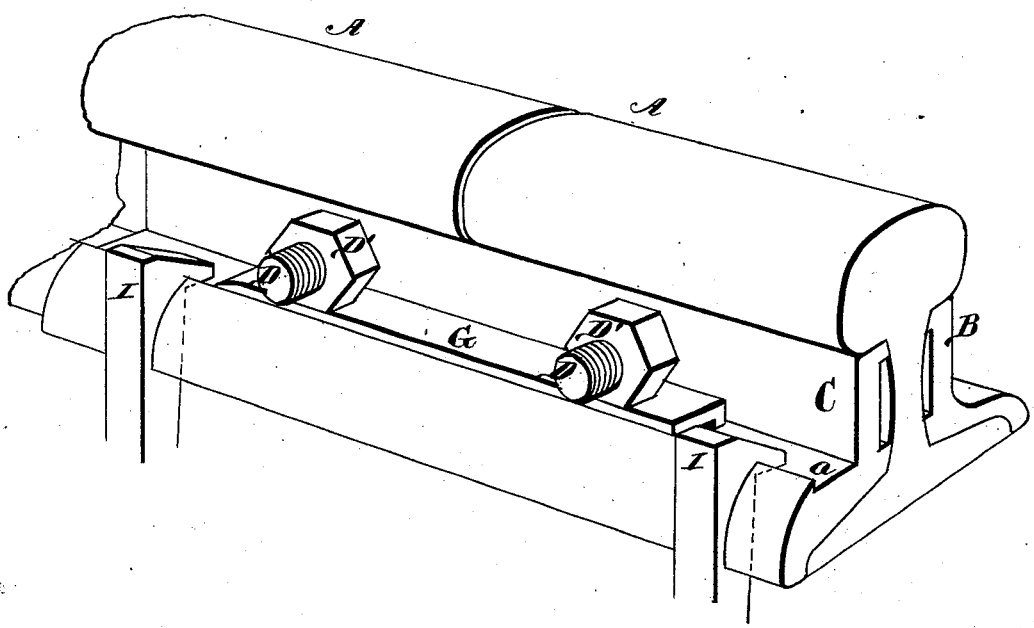
Witnesses:
Inventors.
John Collman.
John Collman, Jr.
Attorneys.

UNITED STATES PATENT OFFICE.

JOHN COLLMAN AND JOHN COLLMAN, JR., OF CEDAR RAPIDS, IOWA.

IMPROVEMENT IN NUT-LOCKS.

Specification forming part of Letters Patent No. 197,606, dated November 27, 1877; application filed September 15, 1877.

*To all whom it may concern:*

Be it known that we, JOHN COLLMAN and JOHN COLLMAN, Jr., of Cedar Rapids, in the county of Linn and State of Iowa, have invented a new and valuable Improvement in Fish-Plates; and we do hereby declare that the following is a full, clear, and exact description of the construction and operation of the same, reference being had to the annexed drawing, making a part of this specification, and to the letters and figures of reference marked thereon.

The figure of the drawing is a representation of a perspective view of our fish-plate.

Our invention relates to railroad-rail joints; and it consists in the construction of the fish-plates, combined with the device for locking the nuts on the bolts, as will be hereinafter more fully set forth.

The annexed drawing, to which reference is made, fully illustrates our invention.

A A represent the ends of two adjoining railroad-rails. B and C are the two fish-plates, placed on opposite sides of the rails. D D are the ordinary bolts passing through the fish-plate B, through the rails, and then through the fish-plate C, and having the nuts D' D' screwed upon their ends at the side of the fish-plate C. The two fish-plates are so constructed as to fit over or overlap the foot of the rail. The fish-plate C has, in addition thereto, near and along its outer side, an upwardly-projecting rim or flange, *a*, as shown, forming, as it were, a groove between it and the vertical portion of the fish-plate.

G represents a bar of iron, steel, or wood, driven in said groove under the nuts D', so that the nuts cannot work loose. The rim *a* on the fish-plate holds said bar in its place on the side, and spikes I I hold it in its place on the ends, said spikes being fitted in notches in the fish-plate and foot of the rail, and driven into the ties underneath.

The bar G will prevent the nuts of the track-bolts from working loose. It will stiffen the joints of the rails, and prevent them from flapping up and down, so that the cars will run much smoother and with less noise.

What we claim as new, and desire to secure by Letters Patent, is—

The combination, with the rails A, bolts D, and nuts D', of the fish-plate C, formed with the rim *a*, the bar G, and the spikes I, all substantially as and for the purposes set forth.

In testimony that we claim the above we have hereunto subscribed our names in the presence of two witnesses.

JOHN COLLMAN.
JOHN COLLMAN, JR.

Witnesses:
   A. V. EASTMAN,
   R. B. CARMAN.